United States Patent Office 3,705,876
Patented Dec. 12, 1972

3,705,876
METHOD OF MAKING POLYOXYMETHYLENES
Herbert Amann, Grossauheim, and Erich Bäder, Hanau, Germany, assignors to Deutsche Gold- und Silber-Scheideanstalt vormals Roessler, Frankfurt am Main, Germany
No Drawing. Filed June 25, 1970, Ser. No. 49,973
Claims priority, application Germany, June 28, 1969, P 19 32 866.6
Int. Cl. C08g 1/04, 1/20
U.S. Cl. 260—67 FP                    9 Claims

ABSTRACT OF THE DISCLOSURE

Cyclic oligomers of formaldehyde, specifically trioxane and tetroxane, are polymerized in the presence of radical generators to reduce the polymerization temperature peak and loss by evaporation.

BACKGROUND OF THE INVENTION

The invention relates to an improved process for making polyoxymethylenes wherein the temperature peak is lowered and the resulting evaporation losses are reduced.

The polymerization reactions of the cyclic oligomers of formaldehyde such as trioxane or tetroxane are highly exothermic and it is difficult to keep the reaction within an optimum working temperature and in some cases this is entirely impossible. This applies particularly to the bulk polymerization of trioxane and tetroxane where a considerable heat build-up and high temperatures easily occur in the center portions of the polymer block.

Excessive temperatures are particularly undesirable with polyoxymethylenes because of the ceiling temperature. The ceiling temperature is the temperature of the polymer-monomer equilibrium above which only the monomer is thermodynamically stable. This ceiling temperature in case of a polyoxymethylene consisting only of oxymethylene units is for instance as low as 126° C.

Above the ceiling temperature only depolymerization, that is splitting off of formaldehyde, occurs, resulting, among other things, in a lack of homogeneity of the polymerizate as to the degree of polymerization. Trioxane, for instance, in addition boils already at 113° C. and at high temperatures substantial loss therefore occurs by evaporation of not-yet-reacted trioxane. If the reaction is carried out in the presence of copolymerizable compounds, these phenomena furthermore lead to a constant shifting of the mixing ratio of the individual components and thus likewise result in a non-uniform polymerizate. The same applies if comonomers or transfer compounds are added which have lower boiling points.

It is therefore an object of the present invention to provide for a process of bulk polymerization of polyoxymethylenes, specifically the lower oligomers of formaldehyde, wherein the temperature peaks are lowered and resulting losses by evaporation are minimized.

SUMMARY OF THE INVENTION

This object is met by carrying out the polymerization of the compounds, particularly trioxane and tetroxane, in the presence of a radical generator so as to reduce the temperature and loss by evaporation.

DESCRIPTION OF PREFERRED EMBODIMENTS

The process of the invention is a bulk polymerization. This, within the context of the present application, includes processes where minor amounts of an inert agent are present such as, for instance, the solvent of a polymerization initiator which is applied in solution.

The radical generators used in the process of the invention may be inorganic or organic or also mixed inorganic-organic compounds which, under the conditions of the polymerization, decompose into radicals. Preferred are radical generators with short half-value times, for instance such as are below 1 hour at the temperature range between 100 and 150° C.

The preferred organic radical generators are the following:

(a) Azo-compounds;
(b) Lower molecular or high-molecular compounds which contain one or several R—O—O—R' units, wherein R and R' may be the same or different and are hydrogen, alkyl, cycloalkyl, aralkyl, aryl, cyclic or non-cyclic aliphatic acyl or mixed aliphatic-aromatic acyl. R and R', together, and with the $O_2$ bridge may also form a ring or a ring system which may include further O or $O_2$ bridges.

The residues R and R' do not contain over about 20 carbon atoms. They may also have other constituents, for instance halogen, alkoxy, alkyl or acyloxy groups. The aliphatic groups in R and R' may be straight or branched. The terms "aryl" and "aromatic" groups preferably are intended to imply groups derived from benzene, benzenologs, such as naphthalene or anthracene, or compounds with directly connected benzene nuclei such as diphenyl. All these groups can again be substituted as stated above.

The preferred azo-compounds are aliphatic azo-compounds, for instance compounds in which the two hydrogen atoms of the diimine are substituted by carbalkoxy groups or by alkyl groups in which case the last-mentioned groups preferably are substituted by halogen, nitrile or carbalkoxy groups. Specific examples of such azo-compounds are the following: α,α'-azo-isobutyric acid nitrile, α,α'-azo-(α,α-dimethyl)-valeric acid nitrile, α,α'-azo-isobutyric acid dimethylester, and α,α'-azo-(α-methyl)-caproic acid dinitrile.

Examples of radical generators coming under the general group above defined at (b) are the following: peracids such as peracetic acid or perbenzoic acid, diacetylperoxides such as dilauroylperoxide, diacetylperoxide, succinylperoxide; diaroylperoxides such as dibenzoylperoxide, bis-(p-chlorobenzoylperoxide), bis-(2,4-dichlorobenzoylperoxide); peresters, such as tert.-butylperbenzoate, tert.-butylperlaurinate, mono - tert.-butylpermaleinate, di-tert.-butylpermalonate, tert.-butylperoctoate, tert.-butyl - perpivalate; hydroperoxides (R—O—O—H) such as tert.-butylhydroperoxide, di-tert.-butylperoxide, cumylhydroperoxide, acetonehydroperoxide, cyclohexanone-hydroperoxide; dialkylperoxides such as hydroxyheptylperoxide; keto- and aldehoperoxides as well as their esters and ethers, for example acetoneperoxide, cycloheptanoneperoxide.

An example of an inorganic radical generator is hydrogen peroxide. An example of a mixed inorganic-organic radical generator would be isopropylpercarbonate. The accomplishment of the lowering of the temperature peak and reduction of evaporation loss exists both in homo- and copolymerization.

The copolymerization in this case would particularly involve the polymerization with oxacyclic compounds with at least one C—C bond in the ring, such as for instance cyclic aliphatic or araliphatic acetals, ketals, ethers, esters or also with polymeric ethers, acetals, or esters such as for instance polydioxolane, polyepoxydes or copolymers of trioxane and ethyleneoxide. Likewise, chain transfer media may be added which permit incorporation of thermically stable end groups such as for instance aliphatic or araliphatic or aromatic linear ethers, for instance dibenzylether, diisopropylether, acetals, ketals, esters or anhydrides. In case of this type of copolymerization there is no specific limitation regarding the mixing ratio of the initial components in so far as the process of the present invention is concerned.

The invention is particularly useful for the bulk polymerization of trioxane and tetroxane, both as homopolymerization and as copolymerization, particularly in the presence of cyclic monomeric acetals or polymeric acetals such as 1,3-dioxolane, 1,3-dioxacycloheptane, polydioxolane or non-cyclic acetals such as dimethylformal, diethylformal, or dibutylformal.

There may also be added an initiator for the polymerization and, preferably, the conventional cationic initiators such as protonic acids, ansolvo acids and cation-forming compounds. Examples are boronfluoride, boronfluoride etherate, $SnCl_4$, $SbCl_5$, $SbF_5$, antimonytrifluoride and other Friedel-Crafts catalysts as well as complexes thereof, elemental iodine, aryldiazoniumfluoroborates, oxonium salts, perchloric acid and perchloric acid derivatives.

Preferred among the perchloric acid derivatives are the perchloric acid esters, particularly those formed with aliphatic alcohols such as tert.-butylperchlorate, methoxymethylperchlorate or aromatic, for example araliphatic, alcohols such as triphenylmethylperchlorate, methyldiphenylmethylperchlorate, dimethylphenylmethylperchlorate. In this group are furthermore perchloric acid anhydrides, particularly anhydrides of perchloric acid and carboxylic acids such as acetylperchlorate, benzoylperchlorate and ether- or ketone-perchlorates as well as inorganic perchloric acid derivatives such as are set forth, by way of example, in Gmelin's "Handbook of Inorganic Chemistry," eighth edition, System No. 6, pp. 391–400 and Appendix B, pp. 463–465.

Examples of inorganic perchloric acid derivatives are the following: salts of perchloric acid, anhydrides of the perchloric acid with inorganic acids, for example $NOClO_4$, metallic organic perchlorates such as trimethylsilylperchlorate, triphenylstannylperchlorate, iodoniumperchlorate, telluriumperchlorate, antimonyperchlorate and talliumperchlorate.

The polymerization, however, can also be initiated by other conventional methods such as high-energy radiation, for instance by ultraviolet light or gamma-rays.

The polymerization is carried out by the conventional methods employed for making polyoxymethylenes. The radical generators can be added prior to or during the polymerization. They may be added, for instance, alone, that is as pure substance or, if desired, together with an initiator, or also as mixtures or solutions in a comonomer or transfer medium, or as solutions in an inert solvent, or also atomized in an inert carrier gas. Inert media in this connection may for instance be benzene or gasoline hydrocarbons, hydroaromatic compounds, chlorinated hydrocarbons, etc. The inert carrier gas may for instance be nitrogen.

If the radical generators are used together with the comonomer or a transfer agent, it is preferred to disperse the radical generator homogeneously in the other material or to form a homogeneous solution thereof. It will be understood that the radical generator can also be mixed with or dissolved in the polymerizable materials prior to the polymerization. It is, however, advisable that, in that case, the addition be made shortly before commencement of the polymerization, particularly in those cases where the radical generator is subject to easy decomposition.

It will furthermore be understood that mixtures may also be used of different radical generators.

The addition of the radical generators is carried out in conventional manner and using conventional apparatus. It can for instance be effected by stirring, kneading, shaking, fluidizing, injection, introduction by means of a gas current, etc. The addition can also be effected as a continuous process.

The amount of radical generators necessary to obtain the result of a desirable working temperature is small. With the usually employed concentration of polymerization initiators, the amount of radical generators is normally between 0.5 and 500 p.p.m., preferably between 5 and 100 p.p.m.

It should be understood that the amount of radical generators depends on the type of polymerization initiator and the particular concentration thereof. For instance, in case of a particular polymerization initiator, it is necessary to increase the concentration of radical generator if the concentration of polymerization initiator is increased and if the same temperature reduction is desired. Likewise, an increase in the amount of radical generator is advisable in case of highly active initiators.

The addition of the radical generators as proposed in this invention permits a better control of the entire polymerization process and also permits carrying out the process under milder and more uniform conditions. This applies particularly for continuous processes where the heat accumulation is high.

As has been stated the effect of the addition of the radical generator is that the temperaure and evaporation losses occuring during polymerization are lower than without such addition. Depending on the individual process phases and individual polymerization conditions, one or the other of these two results may predominate or may be present exclusive of the other effect. In any case, the addition of the radical generator makes it possible to maintain a specific working temperature during the polymerization or at least to accomplish this in a better manner than heretofore possible. This in turn gives a greater leeway in the selection of low-boiling-point comonomers or transfer media or even polymerization initiators since there is less apprehension of loss by evaporation.

Also, the evaporation of formaldehyde is reduced. For instance, with the polymerization of trioxane in the presence of 1,3-dioxacycloheptane a substantial reduction of the loss by evaporation is accomplished compared with a process where no radical generators are added.

The addition of the radical generators also permits controlling the period of induction or to extend such time depending on the amount employed. This is often of substantial importance when carrying out the process on a technological scale.

The following examples will further illustrate the invention.

The polymerization in these examples was carried out in cylindrical vessels of a diameter of 40 mm. which were immersed up to the level of their contents into a tempering bath of 60° C. The starting temperature in each case was 70° C. The catalyst solutions used in each case were dosed in by means of an injector and were mxied in by strong stirring. The catalysts, such as the initiating compounds, were dissolved in the following solvents: $SnCl_4$ and $SbCl_5$ in 1,2-dichloroethane; $HClO_4$ in a mixture of 3% by volume of acetic acid anhydride and 97% by volume of 1,2-dichloroethane. The organic perchlorates were used in a mixture of 3% by volume of nitromethane and 97% by volume of 1,2-dichloroethane. The temperature change during the polymerization was recorded by a thermo element which was immersed in the center of the vessel.

As already indicated, the effect of the radical generators is of particular importance with highly active cationic initiators such as the perchloric acid initiators and initiators derived from tin and antimony compounds.

The unit designation p.p.m. used in the following examples stands for mole/$10^6$ moles trioxane.

EXAMPLE 1

A mixture of 180 g. trioxane and 20 mg. benzoyl peroxide was polymerized by adding to the mixture 0.9 p.p.m. tert.-butylperchlorate. The temperature within the polymer block was found to be not over 130° C.

A comparison test carried out in the same manner but without using benzoyl showed that the temperature within the polymer block rose up to 149° C.

EXAMPLE 2

A mixture of 180 g. trioxane, 5 g. 1,3-dioxolane, 0.30 g. dimethylformal and 50 mg. succinylperoxide was polymerized by adding to the mixture 0.6 p.p.m. tert.-butyl perchlorate.

A comparison test was then carried out without the succinyl peroxide. The temperature maximum with the succinyl peroxide was 132° C. The temperature maximum in the comparison test was 142° C.

EXAMPLE 3

The mixture of 180 g. trioxane, 0.40 g. dibutylformal and 20 mg. 2,4-dichlorobenzoylperoxide was polymerized by adding 0.6 p.p.m. tert.-butylperchlorate.

A comparison test was then carried out without using the dichlorobenzoylperoxide.

The temperature maximum reached with the dichlorobenzoylperoxide was 125° C.; the temperature without this addition was 149° C.

EXAMPLE 4

A mixture of 180 g. trioxane, 10 g. 1,3-dioxepane and 25 mg. cyclohexanoeperoxide was polymerized by adding 0.9 p.p.m. tert.-butylperchlorate. The temperature within the polymer block rose to 130° C. After extraction there was obtained a yield of 81.5% polymer.

In a comparison test the polymerization was carried out without the cyclohexanone peroxide. The maximum temperature reached in this test was 142° C.

EXAMPLE 5

180 g. of trioxane was reacted with 5 mg. tert.-butylperpivalate and were polymerized by adding 0.5 p.p.m. perchloric acid.

A comparison test was carried out without the butylperpivalate. The temperature maximum reached with the additive was 139° C.; without the butylperpivalate it was 149° C.

EXAMPLE 6

A mixture of 180 g. trioxane, 0.40 g. dibutylformal and 0.6 mg. $\alpha,\alpha'$-azo-isobutyric acid dinitrile was polymerized by adding 0.45 p.p.m. tert.-butylperchlorate.

In a comparison test the polymerization was carried out without adding the nitrile. The temperature maximum with the nitrile was 132° C.; the temperature maximum in the comparison test was 149° C.

EXAMPLE 7

A mixture of 180 g. trioxane, 7 g. 1,3-dioxepane and 10 mg. lauroylperoxide was polymerized by adding 0.45 p.p.m. tert.-butyl-perchlorate.

The polymerization was then carried out without the lauroylperoxide in a comparison test. The results obtained were as follows (values in parentheses being those of the comparison test): weight loss during the polymerization 1.6% (4.9%), temperature maximum 114° C. (133° C.).

EXAMPLE 8

A mixture of 180 g. trioxane, 5 g. 1,3-dioxolane and 25 mg. tert.-butylhydroperoxide was polymerized by adding 0.1 p.p.m. acetylperchlorate. The temperature maximum in this case was 120° C.

The polymerization was then carried out in a comparison test without the tert.-butylhydroperoxide. In this case the temperature difference was very substantial since the temperature reached was 142° C.

EXAMPLE 9

20 p.p.m. lauroylperoxide were dissolved in 180 g. trioxane and the solution was then polymerized by adding 2.3 p.p.m. $SnCl_4$. In a comparison test the polymerization was carried out without the lauroylperoxide.

The weight loss during the polymerization with the lauroylperoxide was 3.3%; without the lauroylperoxide it was 5.5%.

EXAMPLE 10

20 p.p.m. lauroylperoxide were dissolved in 180 g. trioxane and the mass was then polymerized by adding 6.6 p.p.m. $SbCl_5$. A comparison test was carried out without the lauroylperoxide. The weight loss during the polymerization with the lauroylperoxide was only 1%, the loss in the comparison test being 4.9%.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. In the cationically initiated polymerization of trioxane or tetroxane, wherein the polymerization is carried out in bulk at elevated temperatures, the improvement comprising carrying out the reaction in the presence of between about 0.5 and 500 p.p.m. of a radical generator in addition to said cationic initiator so as to reduce the polymerization temperature peak or the loss by evaporation or both.

2. The process of claim 1, wherein the radical generator is an azo-compound.

3. The process of claim 1, wherein the radical generator is a low or high molecular compound which includes at least one R—O—O—R' group, R and R' being the same or different and being hydrogen, alkyl, cycloalkyl, aralkyl, aryl, cyclic or non-cyclic aliphatic acyl, aromatic acyl or mixed aliphatic-aromatic acyl and wherein R and R', together and including the $O_2$ bridge, may form a ring or ring system.

4. The process of claim 3, wherein R and R' are additionally substituted by halogen, alkoxy, alkyl or aryloxy.

5. The process of claim 3, wherein said alkyl, cycloalkyl, aralkyl or aryl group is substituted in the $\alpha$-position by hydroxy, alkoxy or acyloxy.

6. The process of claim 3 wherein said ring or ring system includes at least one hetero oxygen atom in addition to said $O_2$ bridge.

7. The process of claim 1, wherein said radical generator is a percarbonate.

8. The process of claim 1, wherein a mixture of different radical generators is employed.

9. The process of claim 1, wherein the polymerization of the trioxane or tetroxane is carried out in the presence of an ether, acetal, ketal, ester or anhydride as copolymerizable material or chain transfer medium.

References Cited

UNITED STATES PATENTS

| | | | |
|---|---|---|---|
| 3,144,433 | 8/1964 | Hopff et al. | 260—67 FP |
| 3,242,063 | 3/1966 | Okamura et al. | 204—159.21 |
| 3,122,525 | 2/1964 | Kern et al. | 260—67 FP |

OTHER REFERENCES

C & EN, Sept. 6, 1965, pp. 40–41.

WILLIAM SHORT, Primary Examiner

L. M. PHYNES, Assistant Examiner

U.S. Cl. X.R.

204—159.21